June 9, 1936.  H. H. STYLL ET AL  2,043,842
OPHTHALMIC MOUNTING
Filed Feb. 20, 1933
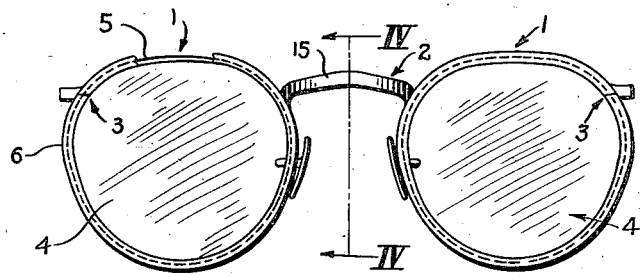
FIG. I.
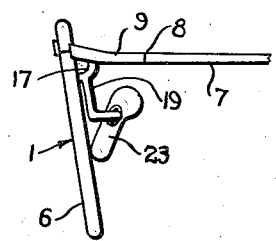
FIG. II.
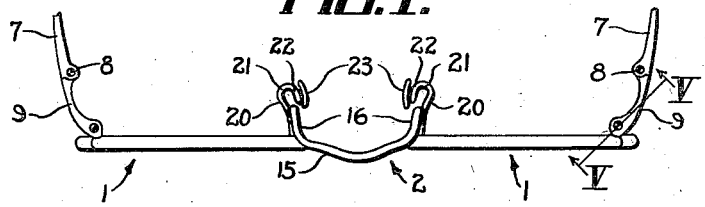
FIG. III.
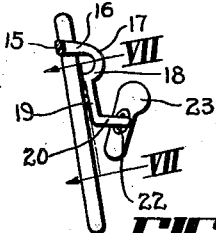
FIG. IV.
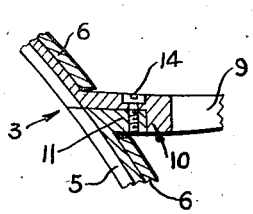
FIG. V.
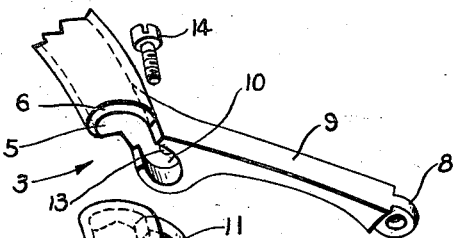
FIG. VI.
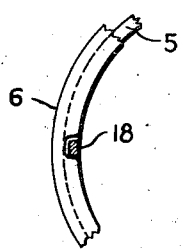
FIG. VII.
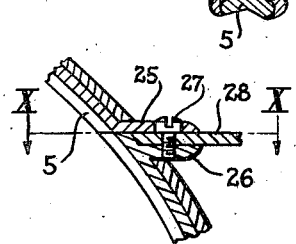
FIG. VIII.
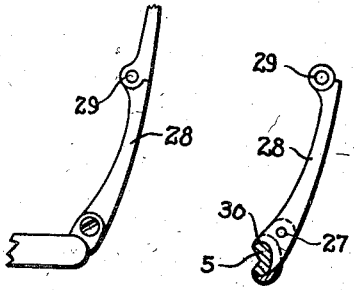
FIG. IX.   FIG. X.
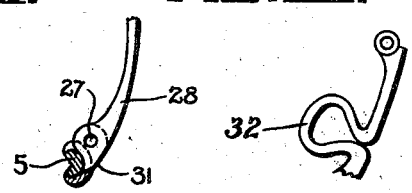
FIG. XI.   FIG. XII.
INVENTORS
LOUIS L. GAGNON
HARRY H. STYLL
BY
Harry H. Styll
ATTORNEY Patented June 9, 1936

2,043,842

UNITED STATES PATENT OFFICE 2,043,842

OPHTHALMIC MOUNTING

Harry H. Styll and Louis L. Gagnon, Southbridge, Mass., assignors to American Optical Company, Southbridge, Mass., a voluntary association of Massachusetts Application February 20, 1933, Serial No. 657,580

5 Claims. (Cl. 88—53)

This invention relates to improvement of ophthalmic mountings and to an improved process of making and fitting the same to the wearer.

One of the principal objects of the invention is to provide an improved ophthalmic mounting and process whereby said mounting may be quickly and easily adjusted to the facial requirements of different individuals.

Another object of the invention is to provide an ophthalmic mounting having means whereby the temples or sides thereof may be adjusted in or out, up or down, or varied in lengths as desired.

Another object is to provide means whereby the narrowing effect of connecting the temples high up adjacent the top of the lenses may be adjustably compensated for thereby reducing the number of sizes of mountings necessary to be carried in stock by the dealer.

Another object of the invention is to provide an ophthalmic mounting having combination metallic and non-metallic rim portions and novel means for connecting the meeting ends of said rim portions and having means incorporated therewith for adjustably supporting the temples or sides of the mounting.

Another object of the invention is to provide a novel means of varying the length of temples and which will obviate the necessity of having to carry a large stock of different size temples.

Another object is to provide a relatively resilient support for the temples or sides of an ophthalmic mounting of the above character.

Another object is to provide interchangeable temple supports of a rigid, ductile, or resilient nature.

Another object is to provide simple, inexpensive, and neat appearing means of accomplishing all of the objects and advantages of the invention.

Other objects and advantages of the invention will become apparent from the following description taken in connection with the accompanying drawing, and it will be apparent that many changes in the details of construction, arrangement of parts and processes shown and described may be made without departing from the spirit of the invention as expressed in the accompanying claims. We, therefore, do not wish to be limited to the exact details and processes shown and described as the preferred forms only have been shown by way of illustration.

Referring to the drawing:

Fig. I is a front elevation of an ophthalmic mounting embodying the invention.

Fig. II is a side elevation of the mounting shown in Fig. I.

Fig. III is a plan view of the mounting shown in Fig. I.

Fig. IV is a sectional view taken on line IV—IV of Fig. I.

Fig. V is a sectional view taken on line V—V of Fig. III.

Fig. VI is a fragmentary perspective view of the split rim connection showing the parts disunited.

Fig. VII is a fragmentary sectional view taken on line VII—VII of Fig. IV.

Fig. VIII is a view similar to Fig. V, showing a modified form of the invention.

Fig. IX is a plan view of Fig. VIII.

Fig. X is a sectional view taken on line X—X of Fig. VIII.

Fig. XI is a view similar to Fig. X, showing a further modification.

Fig. XII is a view similar to Fig. X, showing a further modification.

It has been usual, in the past, in ophthalmic mountings to provide a plurality of different size fronts and different lengths of temples to fit the requirements of different individuals. The lens holding members, bridge and nose guards of the fronts, were adjustably supported in cooperative relation with each other, so that they could be adjusted relative to each other to compensate for slight variations in the facial characteristics of different individuals. These various adjustments proved very satisfactory, but it was found in many instances that the temples could not be positioned to clear the sides of the wearer's head. This defect was very troublesome and intolerable in that during the use of the mounting the said temples would create a pressure on the sides of the head and would cut in the flesh and cause much pain and discomfort. This condition was particularly true in those cases where the temples were connected up high adjacent the top of the lenses as in the case of the popular so-called high endpiece mountings of the day, wherein the distance between the temples was much narrower than in cases where the temples were connected adjacent the horizontal center line of the lenses, because above the center line the edges of the lenses retreat toward the nose. This narrowing of the distance between the temples made it necessary to stock a greater number of sizes and mountings than was usual in the past, and also made it necessary to provide a greater stock of different size or lengths of temples. It, therefore, is a principal object of this invention to provide a single mounting having means incorporated therein whereby the mounting may be quickly and comfortably adjusted to the facial requirements of different individuals, particularly having temple connecting means which may adjustably compensate for the variation in widths of heads and lengths of temples, that will reduce the number of stock sizes and that may be quickly and easily adjusted to the facial requirements of different individuals by relatively untrained operators.

Referring more particularly to the drawing wherein like characters of reference designate like parts throughout the several views the device embodying the invention as shown in Figures I to VII, inclusive, comprises a pair of lens holding members 1, connected by a bridge member 2, and having a split portion 3 adjacent their temple sides to permit the insertion or removal of lenses 4. The lens holding members are preferably formed of an inner metal eyewire 5, which is covered with a nonmetallic covering 6 such as celluloid or other suitable material. The nonmetallic covering 6 is in the form of a shell which is fitted around the inner metallic eyewire 5, and is held thereon by a clamping action created by the natural characteristics of the material.

The mounting is held on the face by the temples or sides 7 which are pivotally attached at 8 to adjustable supports 9. The said adjustable supports 9 are secured to the inner metallic eyewire 5 adjacent the splits 3 as shown in Figures V and VI. The support portion 9 is secured to one end of the eyewire adjacent the split 3 and is provided with a cut out portion 10 adapted to form a housing for a threaded connecting member 11 secured to the opposite split end of the eyewire. The connecting member 11 is provided with a threaded bore 12 which is adapted to be aligned with an opening 13 in the cut out portion 10 when the parts are in assembled relation with each other and are held in said relation by a screw member 14. The temple supports 9 are adjustable by bending in or out, and up or down, as desired so that a single mounting may be quickly and easily fitted to the facial requirements of different individuals. The support 9 as shown in Fig. II, is normally located above the useful field of side vision, and slight variations in the heights of temples at this location may be quickly obtained by the up and down adjustment. It is apparent that the distance between the split rim connection 10 and the temple connection 8 may be adjusted or otherwise varied in length as desired. The bridge member 2 as shown in Figures I, III and IV, comprises a central arch portion 15, having rearwardly extending end portions 16 which are looped at 17 and turned forwardly at 18 for attachment to the lens rims 5. A relatively long depending guard arm support 19 extends downwardly from the loop portions 18 substantially in the rear of the peripheral edge of the lens on each side of the bridge and extends rearwardly at 20 to a loop 21 which terminates in a forwardly extending nose guard or pad connection 22, having the pad or guard 23 attached thereto. In Fig. VII is illustrated how the nonmetallic covering 6 is cut away to clear the bridge support 18. The said nonmetallic covering 6 is likewise cut away to clear the support 9 and connecting member 11 adjacent the split 3 in the eyewire 5.

The support 9 may be formed rigid, ductile or resilient as desired, or may have different portions thereof formed with one or more of the above characteristics. These results may be accomplished by the proper selection and combination of materials or by the proper treatment of said materials. It is to be understood that although the said supports are shown at a high position on the mounting, they may be placed at the horizontal center line of said mountings if desired.

The bridge member 2 may be formed of any desired material and may be rigid, ductile, or resilient as desired, or may be composed of sections or portions having one or more of the above characteristics.

In Figures VIII, IX, and X, there is shown a slight modification wherein the split ends of the eyewire 5 are provided with the endpiece members 25 and 26, having aligned perforations therein and between which is adapted to be secured by the connecting screw member 27 an adjustable temple support 28. The support 28 is made separable and is provided with a temple hinge connection 29 adjacent its end opposite the split rim or eyewire connection. The support 28 as shown in Figure X is provided with an end portion 30 which is cut out to fit the eyewire or lens rim 5 and is held by said rim against movement about the connecting screw 27. The object of forming the support 28 separable from the lens rim is to provide means whereby a plurality of different size supports may be provided, that is, supports of different lengths whereby the temples may be varied in length as desired by interchanging the support member 28. The said supports 28 are also formed rigid, ductile, or resilient and are made interchangeable so that any type support may be used. The said supports 28 are adjustable in or out, and up or down, and may be varied in length to compensate for slight variations in lengths of temples by changing the distance between the end 30 and the temple connection end 29.

In Fig. XI there is shown a further modification wherein the temple support 28 is pivoted to the connecting screw 27 so that said support 28 may be folded in close relation with the front of the mounting when not in use. The said support 28 is provided with a projecting portion 31 which is adapted to engage with the lens rim or eyewire 5 when the support is in position of use.

In Fig. XII there is shown a further modification wherein the temple support 9 or 28 as the case may be is provided with an adjustable loop portion 32 by means of which the length of said support may be varied to vary the length of temple.

The procedure of fitting the mounting to the wearer is as follows:

The lenses having the required prescriptive characteristics are first properly fitted in the lens holding members 1 and are secured therein by the connecting screw 14. The said lens holding members are then adjusted to position the optical centers of the lenses in proper relation with the centers of the pupils of the wearer's eyes by bending the portions 17 or 18 sidewise. The mounting is then placed on the face and the nose rest or guards 23 are adjusted to fit the nose and simultaneously adjusted up or down as required by bending the portions 20 and 21 to raise or lower the optical centers of the lenses so that the said centers may be placed in line with straight ahead vision of the eyes. The arch portion 15 of the bridge is then adjusted to clear the nose and in the height desired by bending the portion 16. The temple supports 9 or 28, as the case may be, are then adjusted up, down, in or out as required, to clear the head and to obtain the desired height of temple, and are simultaneously varied in length to obtain the required lengths of temple. In the case of the support 9 the distance betwen the split rim connection 10 and temple connection 8 is varied to compensate for slight variations in lengths of temples, and in the case of the support 28 wherein a plurality of different lengths of supports are provided, a support of the proper length is connected to the mounting. Slight alterations in said length may be obtained by varying the distance between the eyewire engaging end 30 and temple connection end 29. Any type of support 28, that is, rigid, ductile, or resilient, may be quickly attached to the mounting as desired.

It is apparent that the adjustment of each of the above parts is made independently of the other and without danger of altering and requiring readjustments of the previously adjusted parts.

In instances wherein the length of temple adjustment is relatively great a support having a loop portion intermediate its ends such as shown in Fig. XII may be used.

From the foregoing description it will be seen that we have provided simple, efficient, and economical means whereby a single mounting of the above nature may be quickly and easily adjusted to the various requirements of different individuals.

Having described our invention we claim:

1. In a device of the character described an inner metallic lens rim having two ends and means for holding the ends of the rim together and a relatively long slender arm member extending rearwardly, downwardly and outwardly of the lens rim and terminating in a temple hinge connection, said arm being secured to the rim by the means for holding the ends of the rim together, and an outer non-metallic lens rim superimposed on said inner rim and said arm lying substantially in the longitudinal line of the temple extended and the rim end being higher than the temple end thereof.

2. In a device of the character described, an inner metallic lens rim having abutting offset ends, one of said ends being extended laterally rearwardly and downwardly beyond the other end and terminating in a temple hinge connection, said extension being relatively long, slender and bendable, means securing said offset ends together adjacent the rim and a non-metallic outer rim superimposed on the inner rim, said rearward extension lying substantially in the longitudinal line of the temple extended and the rim end thereof being higher than the temple end.

3. In a device of the character described, an inner metallic lens rim, having abutting offset ends, an extension member extending laterally rearwardly and downwardly beyond said ends and terminating in a temple hinge connection, said member being relatively long, slender and bendable, means securing said extension member and ends together adjacent the said rim, and a non-metallic outer rim superimposed on the inner rim, said rearward extension member lying substantially in the longitudinal line of the temple extended and the rim end being higher than the temple end thereof.

4. In a device of the character described, an inner metallic lens rim having separated ends, a member secured to said rim adjacent an end thereof and having a socket recess therein and having a relatively long and bendable portion extending laterally rearwardly and downwardly of said end and terminating in a temple hinge connection, a socket lug secured adjacent the other end of the rim and fitting into said socket of the socket member, means securing said lug in place in said socket to hold the ends of the rim together, and a divided non-metallic outer rim superimposed on the said inner rim with a portion of its divided ends partially surrounding the points of joinder of the socket member and the socket lug with said inner rim, said rearwardly extending bendable portion lying substantially in the longitudinal line of the temple extended and the rim end being higher than the temple end thereof.

5. In a device of the character described, a lens rim having separated ends adjacent its upper temporal side, one of said ends having a projecting lug member secured to the rear of the rim and the other of said ends having a relatively long arm member secured to the rim with its point of attachment in the rear of the rim and extending outwardly, downwardly, and rearwardly of the plane of the rim so that the effective length of the arm will be concealed from view when the mounting is viewed from the front, and having a temple hinge connection adjacent its opposite free end, one of said members having a recessed portion adjacent one of the separated ends of the rim into which a portion of the member on the opposite end of the rim fits, and means for securing said portion in said recess to secure the separated ends of the rim together, the rim end of the relatively long arm being higher than the temple end thereof in a direction normal to the plane of the rim, and said recessed portion and portion of the member on the opposite end of the rim fitting in said recessed portion also lying in the rear of the rim and being concealed from view by said rim when the mounting is viewed from the front.

HARRY H. STYLL.
LOUIS L. GAGNON.